United States Patent [19]

Becka

[11] Patent Number: 5,097,172
[45] Date of Patent: Mar. 17, 1992

[54] MOUNTING SYSTEM FOR TRANSDUCER

[75] Inventor: Stephen F. Becka, North Bend, Wash.

[73] Assignee: Sundstrand Data Control, Inc., Redmond, Wash.

[21] Appl. No.: 556,007

[22] Filed: Jul. 20, 1990

[51] Int. Cl.$^5$ .................... H01L 41/08; G01P 1/00; G01P 11/30
[52] U.S. Cl. ................................. 310/348; 248/637
[58] Field of Search ............ 310/348, 325, 26; 248/550, 637, 694, 309.1

[56] References Cited

U.S. PATENT DOCUMENTS

| | | | |
|---|---|---|---|
| 3,601,343 | 8/1971 | Sivaslian | 248/204 |
| 3,749,339 | 9/1973 | Avedissian | 248/550 |
| 3,937,433 | 2/1976 | Portaleoni | 248/550 |
| 4,190,782 | 2/1980 | Guess | 310/324 |
| 4,266,157 | 5/1981 | Peters | 310/353 |
| 4,467,651 | 8/1984 | Peters et al. | 73/497 |

FOREIGN PATENT DOCUMENTS

| | | | |
|---|---|---|---|
| 0070277 | 3/1990 | Japan | 310/348 |
| 8603300 | 6/1986 | PCT Int'l Appl. | |
| 8800348 | 1/1988 | PCT Int'l Appl. | |
| 1176972 | 9/1982 | U.S.S.R. | 310/325 |

Primary Examiner—Mark O. Budd
Assistant Examiner—Thomas M. Dougherty
Attorney, Agent, or Firm—Michael S. Yatsko

[57] ABSTRACT

A mounting system for mounting a transducer to a case, such that the transducer position is fixed and stable, and such that stresses on the transducer due to thermal expansion are minimized. The mounting system comprises a band, lower arms extending in a first axial direction from the band, and upper arms extending in a second, opposite axial direction from the band. The transducer arms are connected to the lower, and the upper arms to the case. In response to differential thermal expansion, the arms S bend in a radial direction.

8 Claims, 2 Drawing Sheets

MOUNTING SYSTEM FOR TRANSDUCER

LICENSE RIGHTS

The U.S. government has certain rights in this invention, as provided for by the terms of Contract No. 04704-86-C-0160 awarded by the Department of the Air Force.

TECHNICAL FIELD

The present invention relates to mounting systems for precision transducers and, in particular, to a stress-free mounting system for a transducer such as an accelerometer.

BACKGROUND OF THE INVENTION

It is often necessary to isolate a precision transducer from external stress. Such stress may be caused by mechanical distortion of the case (or other support structure) to which the transducer is mounted, or by differential thermal expansion or contraction between the transducer and the case. Isolation from external stress can in principle be achieved by using a compliant mounting system. However, a compliant mounting system will not in general provide precise and stable alignment of the transducer with respect to its case. For many transducers, (e.g., accelerometers), such alignment is critical for achieving proper operation. A compliant mounting system may also result in unwanted mechanical oscillation of the transducer when the case is exposed to vibration.

One prior accelerometer mounting technique has been to connect the accelerometer to the case by means of a metal ring, or by means of a structural adhesive such as an epoxy resin. The prior noncompliant mounting techniques result in stress being transmitted to the accelerometer due to differential thermal expansion between the accelerometer and the mounting ring and case. These prior techniques also transmit stress to the accelerometer when the case is subjected to mechanical distortion. Distortion of the case be induced by mounting the case to an external structure, or by differential thermal expansion between the case and the external structure. Such stress may lead to thermally induced errors in the accelerometer output.

A second type of prior accelerometer mounting system is described in PCT patent application No. WO 88/00348. This system utilizes a device comprising a plurality of mounting elements joined by bridge sections to form a ring from which the mounting elements extend in an axial direction. In a first embodiment, the mounting elements include ends that are connected to the case, while the ring itself is directly joined to the transducer. Although this technique provides a stable mount with a certain degree of relief from thermal strain, the direct mounting of the ring to the transducer nevertheless produces thermally induced strains whenever the mounting device and transducer are fabricated from materials having different thermal expansion properties. In a second embodiment, the mounting elements are divided into two interleaved sets, with one set being connected to the transducer, and the other to the case. While this approach avoids the direct bonding of the ring to the transducer, it effectively divides the number of support points by two, therefore, providing a less rigid mount.

SUMMARY OF THE INVENTION

The present invention provides an improved system for mounting a transducer to a case or other support. The invention permits the transducer to be secured in a fixed and stable position within the case, and minimizes the transmission of stresses to the transducer resulting from differential thermal expansion.

The mounting system comprises a band, and a plurality of lower arms extending in a first direction from the band. The first direction is parallel to a longitudinal axis about which the band extends. Each lower arm is relatively compliant for bending in a radial direction normal to the longitudinal axis, and relatively noncompliant for bending in other directions. A plurality of upper arms extend in a second, opposite direction from the band. The upper arms are relatively compliant for bending in the radial direction, and relatively noncompliant for bending in other directions. Transducer attachment means spaced from the band in the first direction permit attachment of the transducer and the lower arms to one another. Similarly, support attachment means spaced from the band in the second direction permit attachment of the support and the upper arms to one another.

In one preferred embodiment, the band is dimensioned such that the transducer can be positioned within the band without contacting the band. The transducer attachment means may comprises an inwardly extending flange on each lower arm, and the support attachment means may comprise an outwardly extending flange on each upper arm. The band preferably comprises a material having a coefficient of thermal expansion between that of the transducer and that of the support.

DETAILED DESCRIPTION OF THE INVENTION

Figure 1:
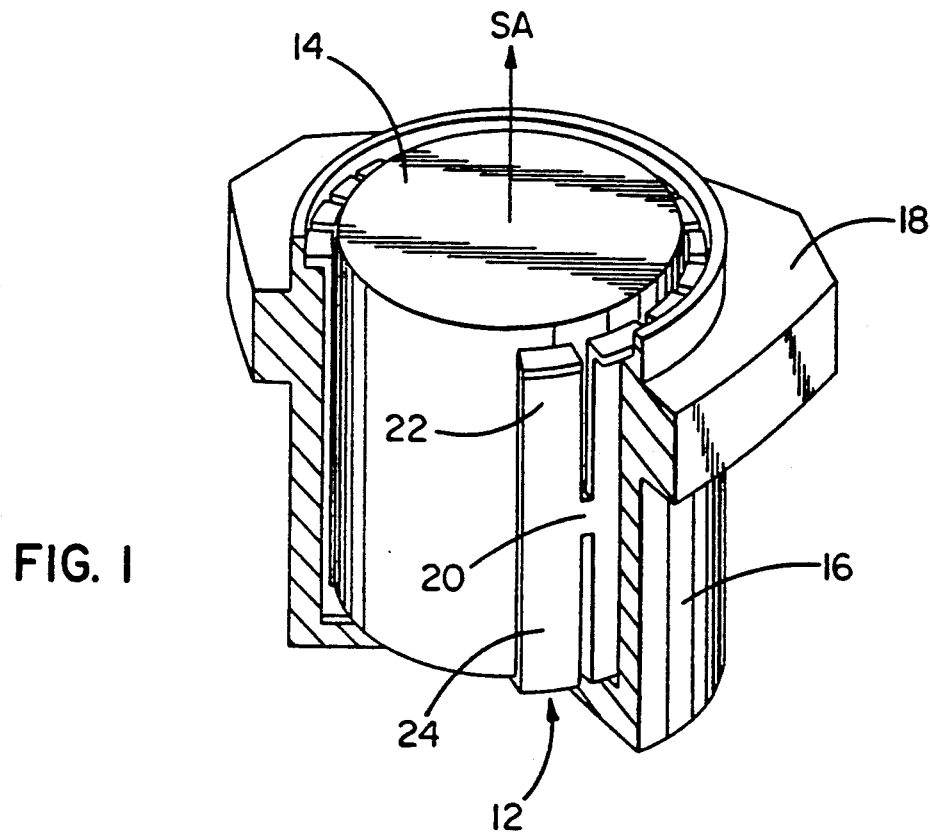
FIG. 1 is a partially cut away perspective view showing an accelerometer mounted within a case using a mounting device according to the present invention.
Figure 2:
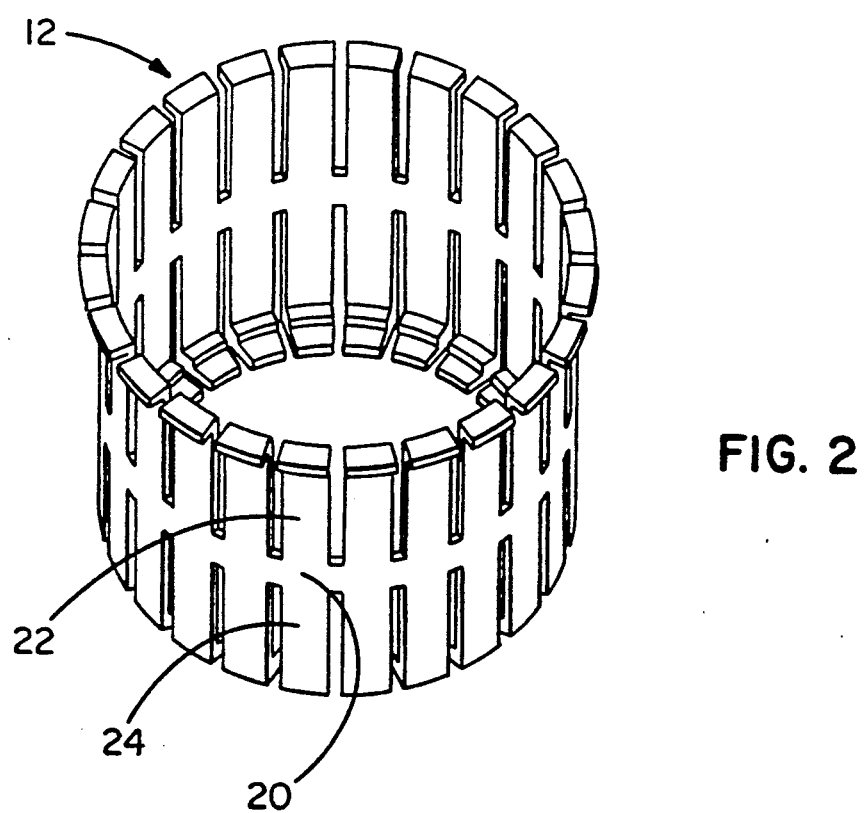
FIG. 2 is a perspective view of a preferred embodiment of the mounting device.
Figure 3:
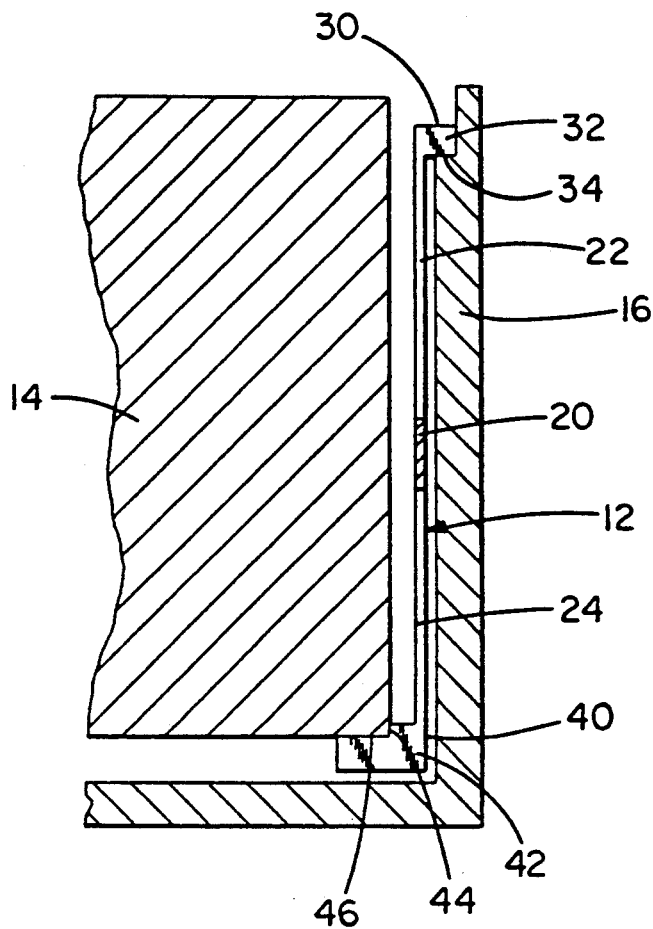
FIG. 3 is a partial cross-sectional view of the accelerometer, mounting device, and case.

A preferred embodiment of the mounting system of the present invention is illustrated in FIGS. 1-3. As shown in FIG. 1, the system comprises mounting device 12 that is used to mount accelerometer 14, or a similar transducer, within case 16. The accelerometer and case are both cylindrical in shape. The accelerometer has a sensing axis SA along which it is sensitive to acceleration, the sensing axis being parallel to the central longitudinal axis of the accelerometer. The case is dimensioned such that the accelerometer and mounting device can be positioned within the case, as shown in FIGS. 1 and 3. Generally, case 16 includes mounting flange 18 that is used to mount the case to an appropriate external structure. Flange 18 is omitted in FIG. 3, to simplify the illustration Mounting device 12 comprises a cylindrical central strip that comprises a band 20, a plurality of upper arms 22 extending upwardly from the band, and a plurality of lower arms 24 extending downwardly from the band. It will be appreciated that the terms "upper" and "lower"

have no absolute significance, and are simply used to clarify reference to the FIGURES. As most clearly shown in FIG. 3, upper arms 22 are used to mount mounting device 12 to case 16, while lower arms 24 are used to mount accelerometer 14 to the mounting device.

In the illustrated embodiment, upper end 30 of each upper arm 22 includes outwardly projecting flange 32 that sits in a shoulder 34 formed in case 16. The width (i.e., the radial direction in FIG. 3) of flange 32 is greater than the width of shoulder 34, such that upper arm 22 is spaced from case 16. Lower end 40 of lower arm 24 includes flange 42 that is shaped so as to form positioning surface 44 and seating surface 46. Seating surface 46 is used to support accelerometer 14 at an appropriate vertical position within the case, while positioning surface 44 is used to radially position accelerometer 14 within mounting device 12, and to space the accelerometer from lower arm 24, such that the lower arm does not contact the accelerometer.

Mounting, device 12 provides precise and stable alignment of accelerometer 14 with respect to case 16, such that accelerometer undergoes minimal translational or rotational movement with respect to the case. However, the mounting device does permit differential radial and/or volumetric thermal expansion or contraction between the accelerometer and the case, and also serves to isolate the accelerometer from stresses that would otherwise result from distortion of the case. Case distortion may be caused by securing mounting flange 18 to a surface that is not perfectly flat, or by differential thermal expansion between the mounting flange and the external structure to which it is attached.

Each of the upper and lower arms is dimensioned such that it is compliant to S-bending in a radial direction, but is substantially rigid with respect to circumferential or axial deflection. Thus, differential radial thermal expansion or contraction between the accelerometer and the case causes each arm to flex in its compliant mode, to take up the differential movement without transmitting stress to the accelerometer. However, the rigidity of the arms in the other directions results in a mounting system in which the accelerometer undergoes minimal rotational or translational movement with respect to the case. The compliance to S-bending in the radial direction is achieved by making the width (circumferential dimension) and length (axial direction) of each arm substantially greater than its thickness (radial dimension). The width of each arm should, of course, be limited with respect to the circumference of the mounting device, such that each arm is essentially planar and compliant in the radial direction. The distance between adjacent arms should be large enough to avoid interference between the arms due to thermal expansion or acceleration inputs.

The mounting system of the present invention provides an arrangement in which the transducer and the case are attached to arms to opposite sides of the band. Thus, as a part attached to either the upper or lower arms expands, due to a temperature change, the arms S-bend radially outward, restrained by the band. Such arm deflections result in a symmetrical radial load in the band, which is restrained by band tension. This load, combined with expansion due to the thermal coefficient of expansion of the band itself, results in a very small expansion of the band, typically 10 percent of the original expansion at the ends of the arms. In the prior art device in which the band is connected directly to the transducer, this band expansion would be applied as direct strain to the transducer itself. The mounting system of the present invention transmits this band strain through a second set of S-bending arms. This transducer the band strain into a very light load on the transducer and case. For a typical application, the resulting strain induced by a given thermal expansion can be reduced by a factor of 40 over that produced in a similar application using such a prior mounting device.

In a typical application for mounting an accelerometer, case 16 is fabricated from stainless stell and has a coefficient of thermal expansion on the order of 18 ppm/°C., the mounting device is composed of Invar and has a coefficient of 1.5 ppm/°C., and the accelerometer comprises fused quartz and has a coefficient of 0.5 ppm/°C. With the band mounted directly to the accelerometer, the coefficient mismatch would result in a significant amount of stress on the accelerometer. However, using the present invention, these stresses are attenuated by S-bending of the arms. In a typical application, the change of size of the band in response to a temperature change would occur primarily due to the coefficient of thermal expansion of the band itself rather than to stress transmitted to the band from the transducer or case through the S-bending arms.

Figure 4:
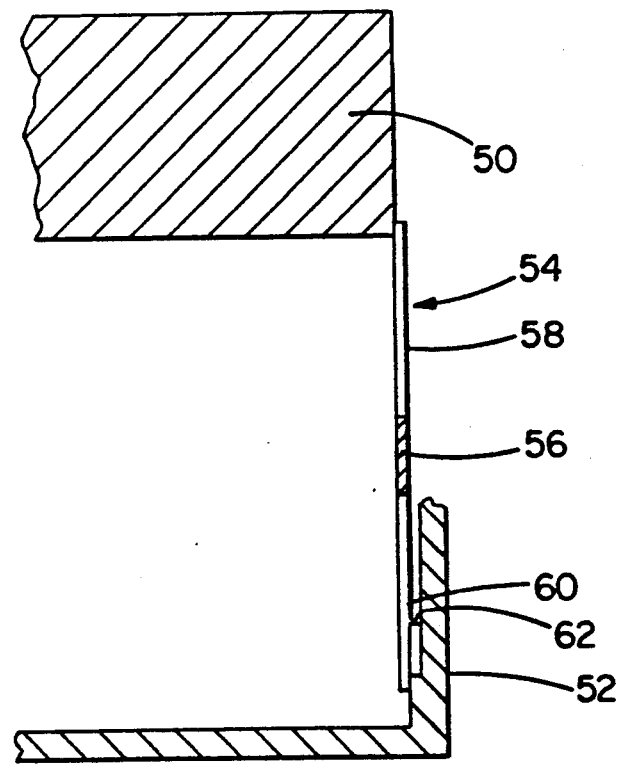
FIG. 4 is a partial cross-sectional view of a second embodiment of the mounting device.

In the mounting device shown in FIG. 1, the transducer and case are approximately coextensive along their longitudinal axes. However, the mounting device can be used in other configurations. For example, FIG. 4 shows an arrangement in which transducer 50 is mounted to case 52 by mounting device 54. Mounting device 54 comprises band 56, upper arms 58 extending upward from the band, and lower arms 60 extending downward from the band. Transducer 50 is connected directly to the inner surfaces of the upper portions of upper arms 58, whereas the outer surfaces of the lower ends of lower arms 60 are secured directly to shoulder 62 of case 52. This arrangement produces all the advantages described above for the embodiment of FIGS. 1-3, except that the overall configuration is less compact.

While the preferred embodiments of the invention have been illustrated and described, variations will be apparant to those skilled in the art. For example, structures equivalent to flanges 32 and 42 could be formed as parts of the case and transducer, respectively, rather than as parts of the mounting device.

Accordingly, the scope of the invention is to be determined by reference to the following claims.

The embodiments of the invention in which an exclusive property of privilege is claimed are defined as follows:

1. A mounting system for mounting a transducer to a support, the mounting system comprising:

a band;

a plurality of lower arms extending in a first direction from the band, the first direction being parallel to a longitudinal axis about which the band extends, each lower arm being relatively compliant for bending in a radial direction normal to the longitudinal axis and relatively noncompliant for bending in other directions;

transducer attachment means spaced from the band in the first direction for permitting attachment of the transducer and the lower arms to one another;

a plurality of upper arms extending in a second direction from the band, the second direction being opposite to the first direction, each upper arm being relatively compliant for bending in the radial direction and relatively noncompliant for bending in other directions; and support attachment means spaced from the band in the second direction for permitting attachment of the support and the upper arms to one another.

2. The mounting system of claim 1, wherein for each lower arm there is associated upper arm connected to the band at the same position around a circumference of the band as the lower arm.

3. The mounting system of claim 1, wherein the support attachment means comprises an outwardly extending flange on each upper arm.

4. The mounting system of claim 1, wherein the transducer attachment means comprises an inwardly extending flange on each lower arm, each inwardly extending flange including intersecting seating and positioning surfaces for mounting the transducer, the seating surface being parallel to said plane in which the band lies, and the positioning surface being parallel to the lower arm.

5. The mounting system of claim 1, wherein the transducer and support have different coefficients of thermal expansion, and wherein the band comprises a material having a coefficient of thermal expansion between that of the transducer and that of the support.

6. The mounting system of claim 1, wherein the band is dimensioned such that the transducer can be positioned within the band without contacting the band.

7. The mounting system of claim 6, wherein the transducer attachment means comprises an inwardly extending flange on each lower arm, each inwardly extending flange including intersecting seating and positioning surfaces for mounting the transducer, the seating surface being parallel to said plane in which the band lies, and the positioning surface being parallel to the lower arm.

8. The mounting system of claim 1, wherein each lower arm includes a distal end spaced from the band in the first direction, wherein the transducer attachment means comprises an inner surface of the distal end of each lower arm, and wherein the mounting system is dimensioned such that the transducer can be directly attached to said inner surfaces.

* * * * *